United States Patent
Riezman et al.

(10) Patent No.: US 9,926,227 B2
(45) Date of Patent: Mar. 27, 2018

(54) TRANSPARENT GLASS ARTICLE THAT IS LOCALLY COLORED IN ITS BULK, AN AN ASSOCIATED METHOD

(71) Applicant: SGD S.A., Puteaux (FR)

(72) Inventors: Yannick Samuel Riezman, Neufchatel-en-Bray (FR); Joel Bourjot, Yonval (FR)

(73) Assignee: SGD PARFUMERIE FRANCE SAS, Puteaux (FR)

( * ) Notice: Subject to any disclaimer, the term of this patent is extended or adjusted under 35 U.S.C. 154(b) by 1251 days.

(21) Appl. No.: 13/867,718

(22) Filed: Apr. 22, 2013

(65) Prior Publication Data
US 2013/0280449 A1   Oct. 24, 2013

(30) Foreign Application Priority Data
Apr. 23, 2012   (FR) ..................................... 12 53704

(51) Int. Cl.
*C03C 23/00*   (2006.01)
*B41M 5/26*   (2006.01)
(Continued)

(52) U.S. Cl.
CPC ......... *C03C 23/0025* (2013.01); *B41M 5/262* (2013.01); *B44C 5/00* (2013.01);
(Continued)

(58) Field of Classification Search
CPC ................................................. C03C 23/0025
See application file for complete search history.

(56) References Cited

U.S. PATENT DOCUMENTS

| 4,057,408 | A |   | 11/1977 | Pierson et al. |
| 5,206,496 | A | * | 4/1993 | Clement ................. B29C 71/04 |
|   |   |   |   | 219/121.6 |

(Continued)

FOREIGN PATENT DOCUMENTS

DE   102004026257 A1   11/2005
DE   102008007871 A1   8/2008
(Continued)

OTHER PUBLICATIONS

JP 4303999 B2 (Shirai) Jul. 29, 2009 (English language machine translation). [online] [retrieved Mar. 3, 2017]. Retrieved from: Japan Patent Office Advanced Industrial Property Network.*
(Continued)

*Primary Examiner* — Erin Snelting
(74) *Attorney, Agent, or Firm* — McClure, Qualey & Rodack, LLP

(57) ABSTRACT

An industrial decoration method in which a colored pattern (11) is made in the bulk of an article (1) made of transparent glass of composition including at least one metallic oxide of silver, of gold, or of copper, said method including the following successive steps:
- a step of laser irradiating the zone of said glass article that is to be colored; and
- a final step of annealing the irradiated glass;
- and being characterized in that a glass composition is used that includes cerium and that has a total content of antimony plus tin that is less than 100 ppm, and in that the step of laser irradiating the zone that is to be colored is performed with laser irradiation having a pulse duration that is less than or equal to $10^{-11}$ s, while delivering power to the glass at greater than $10^{12}$ (Continued)

Figure 1:
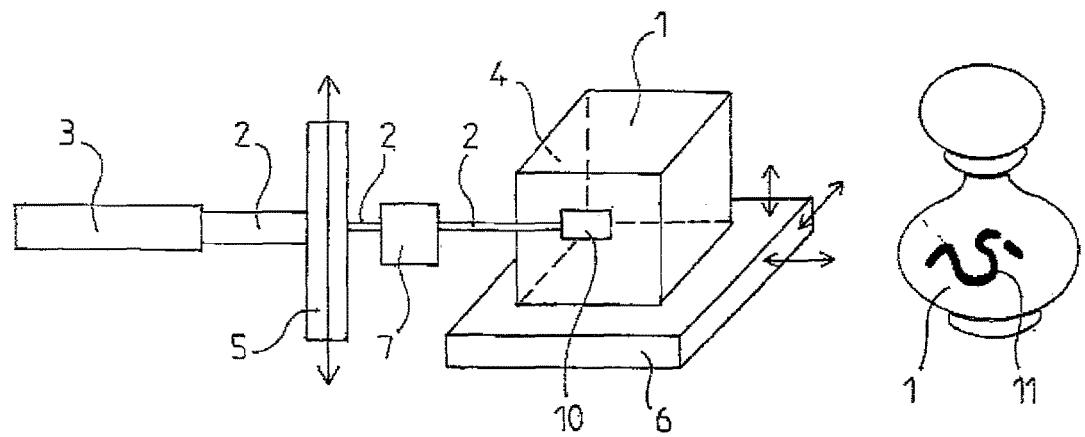

W/cm², and more preferably lying in the range $10^{12}$ W/cm² to $5 \times 10^{14}$ W/cm² for decorating and marking glass articles.

15 Claims, 1 Drawing Sheet

(51) Int. Cl.
  *B44C 5/00* (2006.01)
  *B44F 1/00* (2006.01)
  *C03C 3/095* (2006.01)

(52) U.S. Cl.
  CPC .............. *B44F 1/00* (2013.01); *C03C 3/095* (2013.01); *Y10T 428/131* (2015.01); *Y10T 428/24926* (2015.01)

(56) References Cited

U.S. PATENT DOCUMENTS

| | | | |
|---|---|---|---|
| 2003/0015509 A1 | 1/2003 | Gaissinsky et al. | |
| 2005/0044895 A1* | 3/2005 | Yamate | C03C 4/02 65/111 |
| 2013/0209926 A1* | 8/2013 | Oshemkov | G03F 7/2002 430/5 |

FOREIGN PATENT DOCUMENTS

| | | | |
|---|---|---|---|
| JP | 2004339001 | 2/2004 | |
| JP | 4303999 B2 * | 7/2009 | C03C 3/078 |

OTHER PUBLICATIONS

FR Search Report dated Dec. 17, 2012.

\* cited by examiner

TRANSPARENT GLASS ARTICLE THAT IS LOCALLY COLORED IN ITS BULK, AN AN ASSOCIATED METHOD

CROSS REFERENCE RELATED APPLICATIONS

This application claims priority to French Application Serial No. 1253704 filed Apr. 23, 2012, which is entirely incorporated herein by reference.

The present invention relates to the general and technical field of decorating or marking by coloring a glass substrate, and in particular decorating or marking glass bottles in the bulk of the glass.

The present invention relates to an industrial decoration method whereby a colored pattern is made in the bulk of an article made of transparent glass of a composition that includes at least one metallic oxide of silver, of gold, or of copper, said method including the following successive steps:

a step of laser irradiating the zone of said glass article that is to be colored; and a final step of annealing the irradiated glass.

The present invention also provides a decorated glass article.

It is known to apply decoration on a container of the glass bottle type. In general, the decoration is applied to a portion of the surface of the bottle, e.g. by adhesive, by silkscreen printing, or by etching for purposes of appearance and/or providing information. It is also possible for the decoration to form an integral portion of the glass article, i.e. for it to be fixed in the bulk of the glass and not merely placed on its surface, as is the case in certain known techniques.

The technique of irradiating the glass with a laser makes it possible under certain conditions to provide decoration in the bulk of the glass. This technique can enable a precise portion of the glass to be colored by irradiating a portion of the glass article with a laser beam. The glass is then the seat of electrochemical reactions that can lead to the formation of colored metallic centers.

It is known that the presence of certain metals in the composition of the glass is essential for it to be possible to color the glass, and in particular the presence of a metallic oxide including either silver, gold, or copper. These metals absorb some of the irradiation emitted by the laser in order to form, after a final annealing step, metallic particles that are colored as a result of the presence of reducing agents in the glass.

In order for color to appear, a final annealing step is necessary, during which step, any thermo-reducers, such as antimony or tin, that are present enable the glass to be colored by precipitating metal particles. Without the presence of those elements, it seems to be impossible to color glass. Thus, merely increasing the duration of the irradiation without the presence of thermo-reducer compounds in the glass does not enable coloring to be obtained and merely has the consequence of making the glass brittle by creating microcracks.

Thermo-reducing compounds also reduce non-irradiated metal particles that are present in the total bulk of the glass during the annealing step. Nevertheless, that reduction reaction is less strong because non-irradiated particles are more difficult to reduce. However, that results in all of the non-irradiated zones of the glass being colored a little, even if only very slightly. Such glasses can therefore not be considered as being sufficiently transparent for certain industrial applications, for example bottling perfumes or cosmetics.

Coloring a particularly transparent glass in its bulk, i.e. a glass for which absorbance is very low, is therefore difficult to perform in the state of the art.

The transparency of a glass can be improved by adding cerium oxide to its composition. However it is known that cerium absorbs a fraction of the laser energy, thereby ending up by inhibiting the formation of colored metallic centers. It is then necessary to provide high energy to the glass in order to obtain coloring. That therefore implies degrading the glass, which is not acceptable in an industrial process, and even less acceptable when the glass bottles produced in this way are for industries in which esthetic appearance is a particularly important criterion.

To summarize, known methods of causing articles made of transparent glass to be decorated in their bulk appear to be incapable of decorating articles of the glass bottle type in satisfactory manner while using an industrial process.

The objects given to the present invention consequently seek to remedy the various drawbacks mentioned and to propose a novel method of decorating an article made of transparent glass but without damaging it, and also a novel article made of transparent glass and obtained by that method and decorated by the presence of colored patterns in the bulk of the glass.

Another object of the invention is to propose a novel method of coloring an article made of transparent glass that enables high fabrication rates to be obtained.

Another object of the invention is to propose a novel method that enables an article made of transparent glass to be decorated and to present coloring that is localized and in a plurality of color shades.

The objects given to the invention are achieved by an industrial decoration method in which a colored pattern is made in the bulk of an article made of transparent glass of composition including at least one metallic oxide of silver, of gold, or of copper, said method including the following successive steps:

a step of laser irradiating the zone of said glass article that is to be colored; and a final step of annealing the irradiated glass;

and being characterized in that a glass composition is used that includes cerium and that has a total content of antimony plus tin that is less than 100 parts per million (ppm), and in that the glass composition has been oxidized by the glass passing along a delivery channel having an oxidizing atmosphere, in particular having an increased presence of oxygen, and in that the step of laser irradiating the zone that is to be colored is performed with laser irradiation having a pulse duration that is less than or equal to $10^{-11}$ seconds (s), while delivering power to the glass at greater than $10^{12}$ watts per square centimeter ($W/cm^2$), and more preferably lying in the range $10^{12}$ $W/cm^2$ to $5 \times 10^{14}$ $W/cm^2$.

The objects given to the invention are also achieved by a decorated glass article in which the decoration is obtained by the above-described method of the invention.

Figure 2:
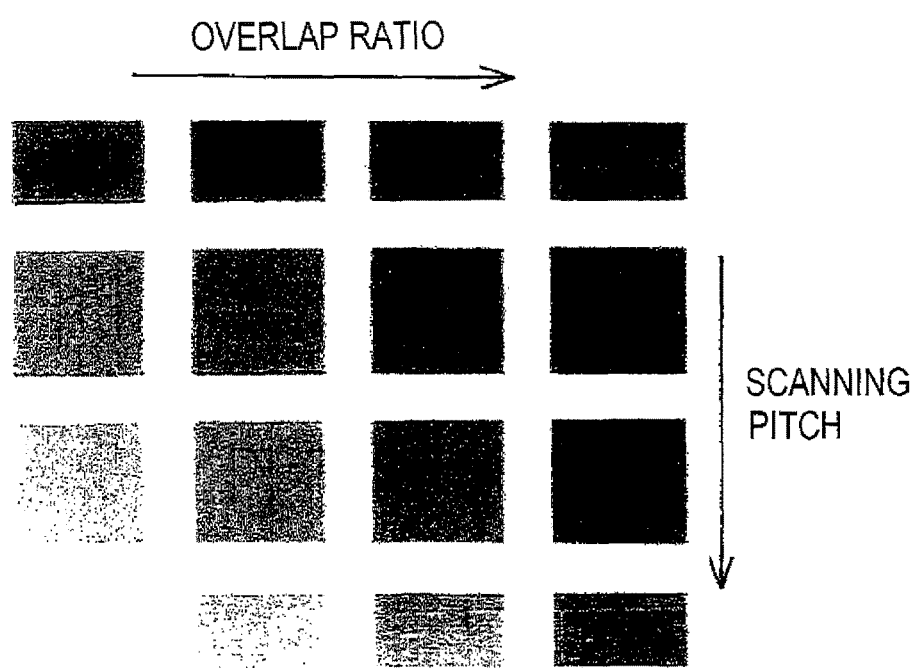

Other objects and advantages of the invention appear on reading the following description and with the help of the accompanying drawing, given purely by way of non-limiting illustration, in which:

FIG. 1 is a diagrammatic view of the device enabling the method for decorating articles made of transparent glass to be performed; and FIG. 2 is a face view photograph of a test concerning decorating a glass article by using the method of the invention.

The glass article 1 in accordance with the invention as shown in general manner in FIG. 1 is irradiated by a beam 2 from a laser 3 that encounters the glass article 1 at an irradiation surface 4, thereby creating an irradiated zone 10 within the glass article 1. All of this irradiated zone 10, or only a portion of it, will end up constituting the colored pattern 11.

In particularly preferred manner, said glass article 1 is constituted by a block or by a container, in particular a bottle. Advantageously, this glass article 1 is for the cosmetics or perfume market, where the esthetic quality of a decorative pattern is particularly important. The glass article 1 that is shown in purely illustrative and non-limiting manner in FIG. 1 comprises a rectangular block of glass or a glass bottle for the cosmetics or perfume market.

It is ensured that the glass article 1 has sufficient transparency by making use of cerium in the composition of the glass, together with a combined content of tin and of antimony that is less than 100 ppm. This threshold value is the value from which the presence of those elements has a significant influence on the transparency of glass. However, the presence of those elements naturally does not prevent the glass being colored in the irradiated zones, quite the contrary.

Advantageously, the decorated glass articles 1 contain no tin and no antimony in order to ensure the transparency of the glass, i.e. the composition of the glass does not have those two elements.

In this way, the glass article has particular transparency properties, namely a very low coefficient of absorption, or "absorbance". Such bottles may then be used for the perfumery, cosmetics, or food markets, for example, without that being limiting on the markets that include applications for such glass articles 1 decorated in this way.

The glass article 1 as decorated in this way necessarily includes in its composition the presence of at least one metallic oxide of silver, of gold, or of copper. The precipitation of this metallic oxide as metallic nanoparticles is responsible for the local coloring of the glass article 1, and in particular for the tint of the coloring.

The article may be colored in this way on its surface, but also in its bulk within the glass article 1. This means that the coloring may be under the irradiation surface 4 of the glass article 1, being located in the volume or the thickness of the glass article 1. Marking takes place in the bulk of the glass article 1 and it is possible to perform marking deep under the surface.

From a practical point of view, it is necessary to mark the glass article 1 at a distance that is greater than glass-making tolerances in order to be sure that marking always takes place inside the glass article 1.

The colored pattern 11 in the glass article 1 can be sharp in appearance. The color contrast between the colored pattern 11 and the transparent glass can be defined clearly and accurately without the presence of a lightly colored intermediate zone. The absence of thermo-reducers is particularly helpful in obtaining this good contrast by ensuring that not all of the metallic particles present in the glass are subjected to reduction.

The versatility of the technique for decorating this glass article 1 also makes it possible to color the glass with tints in which coloring strength is graduated.

The invention also provides an industrial decoration method in which a colored pattern is made in the bulk of an article made of transparent glass of composition including at least one metallic oxide of silver, of gold, or of copper, said method including the following successive steps:

a step of laser irradiating the zone of said glass article that is to be colored; and a final step of annealing the irradiated glass;

and being characterized in that a glass composition is used that includes cerium and that has a total content of antimony plus tin that is less than 100 ppm, and in that the glass composition has been oxidized by the glass passing along a delivery channel having an oxidizing atmosphere, in particular having an increased presence of oxygen, and in that the step of laser irradiating the zone that is to be colored is performed with laser irradiation having a pulse duration that is less than or equal to $10^{-11}$ s, while delivering power to the glass at greater than $10^{12}$ W/cm$^2$, and more preferably lying in the range $10^{12}$ W/cm$^2$ to $5\times10^{14}$ W/cm$^2$.

Thus, the energy delivered locally to the glass article 1 is relatively moderate since it does not damage the glass, e.g. by creating microcracks or significant brittleness. The combination of using irradiation at high powers and exposures of very short durations makes it possible to color a glass that is particularly transparent, i.e. a glass containing cerium and a very small quantity of thermo-reducers. These irradiation power values are thus the ideal compromise for obtaining the desired power within the glass in order to properly initiate the reaction that enables the glass to be colored.

The research work that has led to this invention has thus shown that it is necessary to favor high instantaneous powers over lower instantaneous powers for depositing a given amount of energy per unit area. This has enabled the technique to be made viable for glasses that are particularly transparent.

Furthermore, the decoration method of the invention is performed with a glass that is preferably oxidized. The atmosphere in the glass delivery channel, i.e. the channel going from the fabrication furnace to the production line, is advantageously oxidizing, in particular because of an increased presence of oxygen.

Consequently, the decoration method of the invention comprises the step of oxidizing the glass in the glass delivery channel, said glass delivery channel having an oxidizing atmosphere, in particular having an increased presence of oxygen.

The step of oxidizing the glass in the glass delivery channel is performed before, or prior to the step of laser irradiating the zone that is to be colored.

The composition of the glass is then oxidized by the glass passing along the delivery channel that is provided with an oxidizing atmosphere. This makes it possible to avoid unexpected reduction of metallic oxides present in the composition of the glass, which would color the glass. The oxygen content is preferably higher than 1% in the combustion fumes in contact with the glass, if the burners of the fabrication equipment run on gas. Similar techniques for making the atmosphere oxidizing are known to the person skilled in the art for other types of burner.

Preferably, the irradiation is performed by lasers 3 that have a wavelength lying in the range 250 nanometers (nm) to 1700 nm, and preferably in the range 750 nm to 1200 nm. These wavelengths are adapted to the method since they enable energy to be transmitted to the reducing elements in the glass, thereby initiating local coloring of the glass article 1.

Advantageously, the irradiation is performed by lasers 3 having a pulse duration that is shorter than 6 picoseconds (ps), and that preferably lies in the range 500 femtoseconds (fs) to 2 ps.

In order to obtain the irradiances specified by the invention (substantially greater than $10^{12}$ W/cm$^2$), it is possible to perform the irradiation step using a laser 3 delivering a beam 2 that passes through an optical focusing system 5, as is shown in particular in FIG. 1. This makes it possible to increase the power per unit area that is delivered to the glass in order to optimize the decoration method.

Such a focusing system may also make localized irradiation of the glass possible by focusing the beam 2 accurately on a point. Within the irradiated zone 10, this creates a particular zone in the bulk of the glass where the irradiation is greater than a threshold value. In the end, it is only this particular zone that will constitute the colored pattern 11. The focusing system 5 may serve specifically to irradiate the glass article 1 in such a manner that only a precisely defined zone becomes the colored pattern 11 in the bulk of the glass. It is then possible to select the depth and the width of the coloring in the bulk of the glass article 1, and in particular to color the glass under the irradiated surface 4.

The focusing system 5 may comprise various optical systems that enable the size of the beam 2 from the laser 3 to be reduced in the same manner as can be used for enlarging the beam 2. Reducing the beam 2 may also present the advantage of increasing the power per unit area of the beam 2 from the laser 3, where this is a key parameter of this decoration method.

Advantageously, the irradiation step is combined with a step of moving the beam 2 from the laser 3 or moving the article for decorating 1 at a marking speed in order to make a colored pattern 11 in controlled manner over long distances.

More advantageously, the laser 3 and the glass article 1 are stationary while it is the beam 2 from the laser 3 that is moved with the help of an optical scanner 7 that makes it possible to irradiate accurately a localized zone in the glass, as shown in FIG. 1. Such a system enables the beam 2 to be moved very quickly and thus enables a glass article 1 to be decorated at a fast marking speed.

Furthermore, for certain decorations, it is possible simultaneously with using the optical scanner 7, or otherwise, to move the glass article 1 with the help of a mover system 6. The system is made using conventional technology for controlling small movements in fast and controlled manner. It is shown diagrammatically in FIG. 1. Such mover systems 6 and such an optical scanner 7 are preferably controlled electronically and/or by computer. Decorating glass articles 1 with a complex colored pattern 11 is thereby made easier. The colored pattern 11 may be continuous so as to constitute a single colored area, or it may be discontinuous.

The marking speed corresponds to the time needed for decorating a given area. In non-exhaustive manner, this speed may depend on various parameters such as: the power of the laser 3; the strength of the coloring desired for the decoration; or the travel speed of the mover system 6. The speed may be constant or not constant. This is a function in particular of the colored pattern 11 with which it is desired to ornament the glass article 1.

In the method of the invention, the marking speed is at least greater than 1 square millimeter per second ($mm^2/s$), and preferably greater than 4 $mm^2/s$. The method is then entirely suitable for an industrial application.

The above-described decoration method thus satisfies all of the constraints of a process that is industrial: in particular, it is repeatable, fast, and of moderate cost.

After the irradiation step, a change of tint may appear in the glass in the irradiated zone 10. This first tint comes from the glass being ionized by the laser irradiation, however it is not stable over time. Nor does it correspond to the final color of the decoration. For the coloring to be final, it is then necessary to have recourse to a final step of annealing that serves to reveal the colors of the decorative pattern 11. This final annealing step consists in placing the irradiated glass article 1 in an enclosure at a temperature that preferably lies in the range 300° C. to 700° C., and for a duration that is longer than 10 minutes (min).

At the end of this final annealing step, the glass article 1 is colored inside the irradiated zone 10, which zone may be larger than the zone provided with the decorative pattern 11. The decorative pattern 11 as produced in this way may appear under the irradiated surface 4, at a distance that is positive or zero.

The tint of the coloring of the glass depends on the metal oxide present in the composition of the glass and also on the pair comprising the power of irradiation and the duration of irradiation. The coloring of the material is preferably performed not as a result of a single laser pulse, but as a result of a plurality of pulses. In the method of the invention, the overlap ratio of the laser is varied during the irradiation step in order to modify the strength of the coloring of the colored pattern 11 on the glass article 1 that is to be decorated. The overlap ratio is the percentage of the irradiated area 4 that has been processed by a first pulse from the laser 3 that is processed again by the following pulse.

In preferred manner, the overlap ratio of the laser 3 is increased during the irradiation step in order to increase the strength of the coloring of the pattern 11 on the glass article 1 that is to be decorated. Modifying the coloring merely by adjusting this overlap ratio enables the laser 3 to deliver irradiation pulses at a duration that is always constant, thereby optimizing the operation of a laser.

However it is also possible to modify the strength of coloring by modifying the intensity of the laser. For a constant duration of irradiation on the glass article 1, coloring intensity increases with the intensity of the laser and thus with the total energy deposited on the glass article 1.

Furthermore, the absence or very low content of antimony and tin also makes it possible for the decorative article 11 to appear sharply on the glass since no element other than the metallic oxide irradiated by the laser changes color during the irradiation. This makes it possible to obtain high quality decoration, where high quality constitutes a criterion that is of particular importance for applications where esthetic rendering is essential.

PREFERRED IMPLEMENTATION OF THE INVENTION

By way of non-limiting illustration, there follows a description of an implementation of the invention. It relates to decorating an article 1 made of glass having a composition that comprises in particular silver oxide together with other elements, and that is summarized in Table 1 below:

TABLE 1

Composition of the glass

| Element | | | | | | | | | | |
|---|---|---|---|---|---|---|---|---|---|---|
| $SiO_2$ | $Na_2O$ | $K_2O$ | CaO | MgO | $Al_2O_3$ | $Fe_2O_3$ | CeO | $Li_2O$ | $SO_3$ | $Ag_2O$ |
| % 72.65 | 13.66 | 80 ppm | 10.51 | 570 ppm | 2.20 | 119 ppm | 120 ppm | 0.51 | 0.32 | 300 ppm |

This was a transparent glass composition for use in perfumery together with added silver oxide.

The beam 2 from the laser 3 that was used for these tests illuminated the glass article 1 with 500 fs pulses at a wavelength of 1030 nm. The beam 2 had a diameter of 3.5 mm at the output from the laser 3. The laser was a low power laboratory laser. It was focused using a focusing system 5 so as to obtain an output diameter of 26 micrometers (μm). The irradiation pulse rate was 20 kilohertz (kHz).

Various squares of size 2 mm were irradiated on the glass article 1 using the laser. The glass became shaded after being irradiated by the beam 2 from the laser 3. After a final step of annealing the glass at 450° C. for 30 min, the glass was colored in the various irradiated zones 10. Various tests in which the overlap ratio and also the scanning pitch with which the laser 3 was moved were varied, enabled colors of different shades to be made. This can be seen in FIG. 2 which shows these tests in the following order:

from left to right: overlap ratio varied from 30% to 90% in steps of 20%; and from top to bottom: the scanning pitch was modified over the range 5 μm to 35 μm in steps of 10 μm.

The duration of irradiation was thus different on each test square.

Thus, the greater the amount of energy that was deposited (high overlap ratio), the greater the extent of yellowing, as can be seen in FIG. 2.

Modifying the scanning pitch and the overlap ratio also implies various speeds or machining times necessary for making these 4 mm² patterns, as set out in Table 2 below (where the values given are in seconds):

TABLE 2

Machining time as a function of various parameters

| | Longitudinal overlap ratio (%) equivalent scanning speed (mm/s) | | | |
|---|---|---|---|---|
| Scanning pitch | 30% 300 mm · s⁻¹ | 50% 210 mm · s⁻¹ | 70% 120 mm · s⁻¹ | 90% 40 mm · s⁻¹ |
| 5 μm | 6 | 8.3 | 14 | 40.6 |
| 15 μm | 2 | 2.8 | 4.7 | 13.5 |
| 25 μm | 1.2 | 1.7 | 2.8 | 8.1 |
| 35 μm | 0.9 | 1.2 | 2 | 5.8 |

These machining times correspond to tests that were performed with the laboratory laser described in the example. There also exist lasers that are more powerful and that enable this machining time to be shortened significantly, i.e. that enable the marking speed to be increased. With lasers having the characteristic of pulses of energy equal to 40 microjoules (μJ), such as the Tangerine laser from Amplitude Systemes®, it is possible to multiply the marking speed by a factor of 6. The marking speed may even be increased by a factor of 20 when using a laser having the characteristic of pulses with energy equal to 100 μJ.

Measurements have also shown on that glass that the threshold for triggering coloring lies at a power of about $10^{12}$ W/cm².

Finally, the invention makes it possible to color articles made of particularly transparent glass 1 by a laser irradiation technique that could not previously be implemented on this type of glass.

The decoration method of the invention makes it possible to avoid damaging the glass article while enabling it to be decorated quickly by using irradiation of very short duration but of large power per unit area. This fast marking speed then makes it possible for the method to be inexpensive and particularly suitable for use in an industrial process.

The invention claimed is:

1. An industrial decoration method in which a colored pattern (11) is made in the bulk of an article (1) made of transparent glass of composition including at least one metallic oxide of silver, of gold, or of copper, said method including the following successive steps:
   a step of laser irradiating a zone of said glass article that is to be colored; and
   a final step of annealing the irradiated glass;
   and being characterized in that said composition is used that includes cerium and that has a total content of antimony plus tin that is less than 100 ppm, and in that the glass composition has been oxidized by the glass passing along a delivery channel having an oxidizing atmosphere, and in that the step of laser irradiating the zone that is to be colored is performed with laser irradiation having a pulse duration that is less than or equal to $10^{-11}$ s, while delivering power to the glass at greater than $10^{12}$ W/cm².

2. A method according to claim 1, in which said composition is used that contains neither antimony or tin.

3. A method according to claim 1 in which said irradiation step is performed with a laser (3) having a wavelength lying in the range 250 nm to 1700 nm.

4. A method according to claim 1 in which said irradiation step is performed with a laser (3) having a pulse duration that is shorter than 6 ps.

5. A method according to claim 1 in which said irradiation step is performed with a laser (3) from which the beam (2) passes through an optical focusing system (5).

6. A method according to claim 1 in which the laser has an overlap ratio and the overlap ratio of the laser is caused to vary during the irradiation step in order to modify a strength of the coloring of the colored pattern (11) on the glass article (1) to be decorated.

7. A method according to claim 1 in which the laser has an overlap ratio and the overlap ratio of the laser is increased during the irradiation step in order to increase a strength of the coloring of the colored pattern (11) on the glass article (1) that is to be decorated.

8. A method according to claim 1 in which said irradiation step is combined with a step of moving the beam (2) from the laser (3) or of moving the glass article (1) that is to be decorated at a marking speed in order to make a colored pattern (11) in controlled manner.

9. A method according to claim 8, in which said marking speed is equal to or greater than 1 mm$^2$/s.

10. The method of claim 8 in which said marking speed is greater than 4 mm$^2$/s.

11. A method according to claim 1 in which said final annealing step comprises placing the irradiated glass article (1) in an enclosure at a temperature that lies in the range 300° C. to 700° C. for a duration that is longer than 10 min.

12. The method of claim 1 in which said laser irradiating step delivers power to the glass in the range of $10^{12}$ W/cm$^2$ to $5\times10^{14}$ W/cm$^2$, inclusive.

13. The method of claim 1 in which said irradiation step is performed with a laser (3) having a wavelength in the range of 750 nm to 1200 nm, inclusive.

14. The method of claim 1 in which said irradiation step is performed with a laser having a pulse duration in the range of 500 fs to 2 ps, inclusive.

15. An industrial decoration method in which a colored pattern (11) is made in the bulk of an article (1) made of transparent glass of composition including at least one metallic oxide of silver, of gold, or of copper, said method including the following successive steps:

a step of laser irradiating a zone of said glass article that is to be colored; and a final step of annealing the irradiated glass;

and being characterized in that said composition is used that includes cerium and that has a total content of antimony plus tin that is less than 100 ppm, and in that the glass composition has been oxidized by the glass passing along a delivery channel having an oxidizing atmosphere, in which said oxidizing atmosphere has an oxygen content greater than the oxygen content of the atmosphere outside said delivery channel, and in that the step of laser irradiating the zone that is to be colored is performed with laser irradiation having a pulse duration that is less than or equal to $10^{-11}$ s, while delivering power to the glass at greater than $10^{12}$ W/cm$^2$.

* * * * *

UNITED STATES PATENT AND TRADEMARK OFFICE
CERTIFICATE OF CORRECTION

| | |
|---|---|
| PATENT NO. | : 9,926,227 B2 |
| APPLICATION NO. | : 13/867718 |
| DATED | : March 27, 2018 |
| INVENTOR(S) | : Riezman et al. |

Page 1 of 1

It is certified that error appears in the above-identified patent and that said Letters Patent is hereby corrected as shown below:

On the Title Page

In the title please delete "Transparent Glass Article that is Locally Colored in its Bulk, an an Associated Method" and insert therefor --Transparent Glass Article that is Locally Colored in its Bulk, and an Associated Method--.

Signed and Sealed this
Eleventh Day of June, 2019

Andrei Iancu
*Director of the United States Patent and Trademark Office*